July 27, 1965  D. W. GADE ETAL  3,197,616

TEMPERATURE REGULATION CIRCUIT

Filed March 4, 1963  3 Sheets-Sheet 1

INVENTORS
FRANK WILEY
DONALD W. GADE
BY Albert Rosen
Fraser and Bogucki
ATTORNEYS INVENTORS
FRANK WILEY
DONALD W. GADE
BY Albert Rosen
Fraser and Bogucki
ATTORNEYS

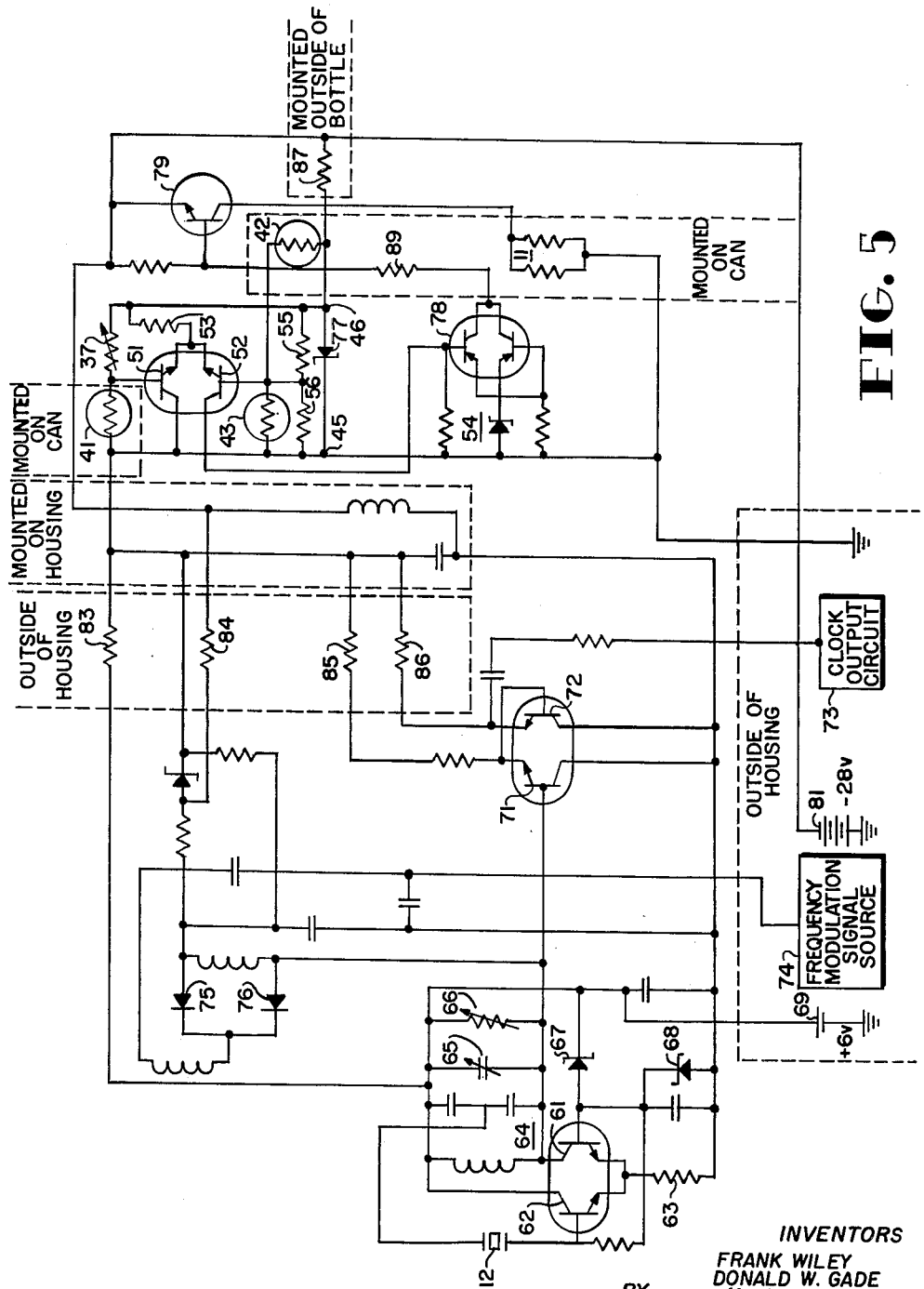

United States Patent Office 3,197,616
Patented July 27, 1965

3,197,616
TEMPERATURE REGULATION CIRCUIT
Donald W. Gade, Fullerton, and Franklyn L. Wiley, Long Beach, Calif., assignors, by mesne assignments, to the United States of America as represented by the National Aeronautics and Space Administration
Filed Mar. 4, 1963, Ser. No. 262,596
8 Claims. (Cl. 219—413)

This invention relates to temperature control circuits, and more particularly to apparatus for rapidly adjusting to a desired temperature level and then maintaining that level with minimum temperature fluctuation.

It is often desirable to maintain close control over the temperature of a selected environment since in many instances devices within the environment cannot tolerate temperature fluctuations of even a few degrees over short time perods. For example, it is frequently necessary in high precision electronic systems to regulate the temperature of electrical components possessing temperature dependent characteristics. Similarly certain chemical processes and production techniques can be satisfactorily carried out only within environments held closely to selected temperature levels.

A serious temperature control problem exists with quartz crystal oscillators which have long been employed for time reference purposes. These quartz crystal oscillators produce a signal at an output frequency which is in part determined by the temperature of the crystal itself. To maintain the signal frequency as constant as possible, such oscillators are usually operated in a closely controlled temperature environment by enclosing the components within an isothermal "oven." Temperature control over the oven is typically effected by using a thermistor to sense the actual oven temperature and then generating an error signal representing the amount by which the actual and desired temperatures differ; this error signal is in turn applied to a D.C. amplifier to control the power delivered to an oven heating coil. Due mainly to the thermal resistances and thermal capacities (specific heats) of the mechanical components within the oven, a time lag exists between the time when power is applied to the oven heating coil and the time when the thermistor senses a temperature change within the oven. This time lag results in a closed-loop stability-problem in the control system which normally limits the amount of gain which can be used in the D.C. amplifier. Due to the reduction in amplifier gain, the operation of the heating coil cannot be made responsive to an error signal as small as may be desired. Consequently, as the temperature of the exterior environment is changed, the interior oven temperature may vary excessively and have an adverse effect on the accuracy of the time standard.

The temperature dependence of quartz crystal oscillators has long been recognized. Various efforts have been made to improve the control over crystal oven temperatures including attempts to isolate more completely the oscillator components within the ovens from changing temperatures in the external environment, and attempts to compensate empirically for temperature changes in the operation of the heating coil. As a practical matter, however, complete isolation is never obtained and empirical compensations cannot prevent the undesired fluctuations in temperature, thereby causing instability. For many applications involving mobile installations it is impractical to increase the size of the oven or the power used in heating it.

Therefore, it is an object of this invention to provide an improved temperature regulation circuit for use in quickly producing and accurately maintaining a desired temperature within an enclosure.

Another object of this invention is to provide an improved circuit for use in closely regulating the temperature of an oven containing electronic components such as those used in a quartz crystal oscillator.

Still another object of this invention is to provide an improved temperature regulated oven for containing the temperature sensitive elements of an electronic circuit.

A further object of this invention is to provide a circuit for controlling the temperature within an enclosure, the circuit providing increased control accuracy by measuring the temperature differential between the interior and exterior of the enclosure.

In accordance with the invention, a thermal differentiator circuit is provided to stabilize and properly regulate the control circuitry of a precision oven device. This thermal differentiator circuit supplements and coacts with the normal temperature sensing circuit, the latter including a normal thermistor sensing element connected as one element of a bridge circuit. The normal thermistor is disposed in good thermal contact with the mass of the oven wall to sense the oven temperature and control the oven heating elements by means of an error signal from the output of the bridge circuit, the error signal amplitude being a function of the overall temperature of the oven wall. The thermal differentiator circuit employs two additional thermistors, one mounted on the oven wall and the other within the oven, each connected in parallel with one of the legs of the bridge. Temperature differences between the oven wall and the interior of the oven generate an additional error signal which can be added to the normal error signal for improved temperature control.

In accordance with one aspect of the invention, the two additional thermistors of the differentiator circuit are connected to provide an additional error signal when the interior temperature of the oven is less than that of the oven wall, as is to be expected during warm-up time. The additional error signal is then subtracted from the signal produced by the normal thermistor in the bridge in such a way as to cause the D.C. amplifier that supplies power to the heating elements, to turn off before the actual final temperature is reached. This may be referred to as a "lead network" arrangement since the controlling error signal actually leads the oven temperature sensed. After the operating temperature has been reached, the differentiator reacts to the operating condition in which the interior of the oven is at a higher temperature than the oven wall, such as occurs when the external ambient temperature is suddenly lowered. The voltage differential signal generated in this case causes the amplifier to turn on in anticipation of the higher power requirement of the oven heating coil.

The addition of the differentiator circuit produces a two-fold effect upon the operation of the temperature control circuit. First, with the appropriate placement of the thermistors, the stability of the closed-loop oven control circuit is greatly improved, making it possible to employ a much higher gain in the D.C. amplifier. A more positive control over oven temperature is thereby obtained and the magnitude of the error signal is correspondingly decreased. Secondly, this lead network has the effect of improving high frequency response of the oven control circuitry and appreciably reducing the settling time required for the oven temperature to stabilize at the desired level after its initial actuation.

In accordance with an alternative embodiment of this invention, the connection of the two additional thermistors in the bridge circuit are reversed to provide a "lag" network. This arrangement results in reverse in sign of the voltage produced by the differentiator circuit; this differentiator circuit output voltage is added to the signal from the normal thermistor bridge to improve the stability of the oven control circuitry loop by reducing its high frequency gain. In this instance a closer control over oven temperature is obtained at the expense of settling time; the greater settling time results from the reduction in the high frequency gain with a consequent longer time period being required between initial actuation and final settling of the circuit at a steady state temperature.

A better understanding of the invention may be gained from reference to the following detailed description and an inspection of the accompanying drawings, in which:

FIG. 5 is a schematic circuit diagram of a crystal oscillator circuit constructed in accordance with the invention to employ a differentiator circuit to control oven temperature.

Figure 1:
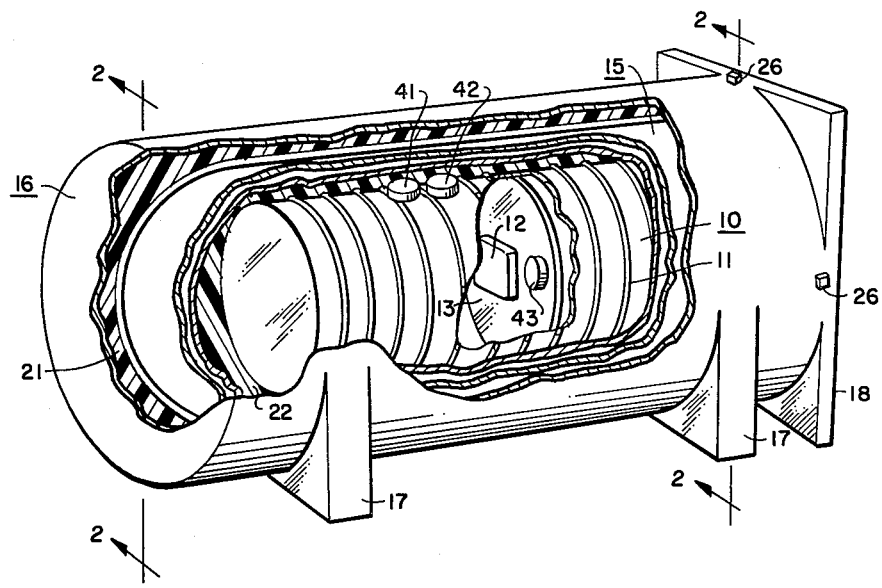
FIG. 1 is a perspective view of a crystal oven according to the invention, with portions thereof broken away to show the arrangement of selected internal elements.

Referring now to FIG. 1, a metal container or can 10 around which is wound a heater winding 11 defines the crystal oven and an isothermal space. A piezoelectric crystal 12, whose temperature is to be controlled, is mounted upon a metal partition 13 and enclosed within the can 10. In order to obtain nearly uniform heat distribution within the can 10 and limit the time required for warm-up, the can 10 and partition 13 should be constructed of a good heat conducting material having a low heat mass, such as aluminum, which has a low specific heat and density.

Surrounding the can 10 is a Dewar silvered vacuum bottle 15, which effectively limits radiation, conduction and convection and this reduces heat transfer between the oven can 10 and the surrounding environment. As is conventional, the Dewar bottle 15 may consist of spaced glass walls having mirror-like finishes with the space between the walls being sealed and evacuated. A cylindrical housing 16 fabricated from an aluminum alloy, and including attached supports 17 and base plate 18 may enclose the entire structure. The housing surface is best coated with a copper flash, a bright silver deposit, and finally a bright nickle plate to provide an additional thermal radiation reflecting surface to assist in maintaining the temperature stability of the oven.

An appropriate potting material fills the spaces between the interior of the housing 16, vacuum bottle 15 and the can 10 to form insulation layers 21 and 22 for heat insulation and for mechanically supporting the various parts. Ideally, the potting material should have the characteristics of: (a) low heat mass so as not to increase circuit stabilizing time, (b) high resistivity to reduce current leakage, and (c) a dielectric constant near unity to prevent de-tuning of the circuit by the potting procedure. Foamed-in-place silicon rubber and polyurethane, and preformed polystyrene, exemplify acceptable potting materials.

Figure 2:
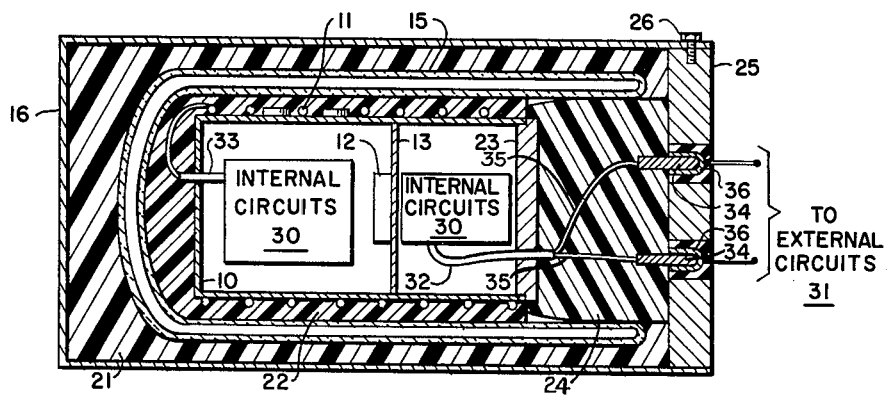
FIG. 2 is a sectional view of the crystal oven of FIG. 1 taken along the plane defined by the lines 2—2 and looking in the direction of the appended arrows.

Referring now particularly to FIG. 2, any conventional method may be employed to thermally seal the open end of the oven structure. However, in many instances a removable cover is desired to allow access to the interior for adjustment or repair of the circuitry contained therein. An aluminum cover 23 constructed to fit snugly into the opening for good thermal contact may close off the open end of the oven can 10. Next a deformable heat insulating plug 24, made of preformed polystyrene or a silicon rubber foam, fits within the mouth of the vacuum bottle 15 to hold the aluminum cover 23 firmly in place. The plug 24 contains a slight recess to receive the edge of the cover 23 so that the plug material overlaps to abut the layer of potting material 22 and form a continuous thermal insulation layer between the exterior of the oven can 10 and the interior walls of the vacuum bottle 15. Finally, an aluminum alloy end-plate 25 is held in place by means of a plurality of locking screws 26 to complete the closure of the housing.

For convenience of illustration, other circuit components contained within the isothermal oven can 10 are shown in FIG. 2 in block diagram form as the internal circuits 30, which are to be connected to external circuits 31. The necessary interconnections of these internal circuits 30 with other circuits components internal of the oven can 10 are preferably made as follows. The connecting wires from various points in the internal circuits are gathered together to form two cables 32 and 33 to pass through the walls of the can 10 at two points. The individual wires gathered to form the two cables 32 and 33 are provided with appropriate insulation covers to prevent electrical contact with each other and with the can walls. After passing through the wall the individual wires of the cables 32 and 33 are unraveled and connected separately to the various points. Next the potting material layer 22 is poured after the connections between can 10 and the vacuum bottle 15 have been made so that all wires from the cable 33 and other components are permanently sealed in place. Individual wires 35 from the flexible cable 32 are attached to individual male connector pins 34 held in place during forming of the plug 24 so that they extend from its outer surface. In both cases, the separation of the individual wires passing through the insulating material reduces to a minimum the amount of thermal energy transferred by these interconnections. The end plate 25 has appropriate female sockets 36 insulated from the aluminum for receiving the male connector pins 34 to complete the couplings to the external circuits 31.

Figure 3:
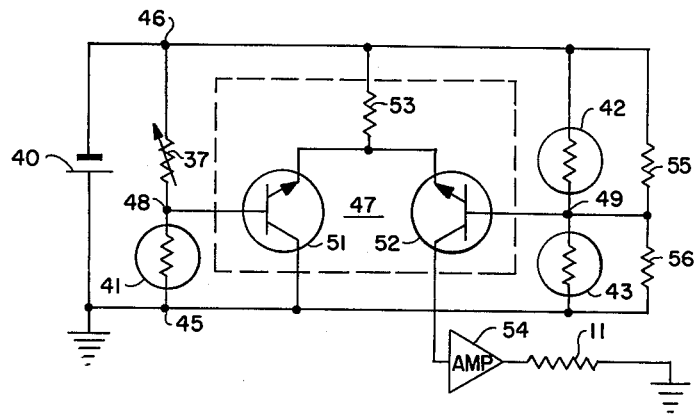
FIG. 3 is a simplified schematic circuit diagram of an oven control circuit according to the invention, with the differentiator elements connected to operate as a "lead network"

Referring now to FIG. 3, an oven control circuit according to this invention includes three thermistors 41, 42, and 43, each having a negative temperature coefficient of resistance and each connected in a different leg of a bridge circuit. A potentiometer 37 forms the fourth leg of the bridge circuit so that the bridge may be balanced for operation at any preselected temperature. The bridge is energized by means of D.C. voltage supplied from a source 40 between the input terminals 45 and 46 of the bridge, and an output amplifier 47 is connected between the output terminals 48 and 49.

Temperatures at the oven exterior are sensed by means of the normal thermistor 41 along with one of the additional thermistors 42 both mounted in a location on and in good thermal contact with the exterior of the oven wall 10 FIG. 1. The remaining thermistor 43 is mounted within the oven on the aluminum partition 13 (FIG. 1) preferably closely adjacent the location of the quartz crystal 12 so as to be protected from thermal gradients by virtue of its containment within the walls of the isothermal oven.

The amplifier 47 (FIG. 3) consists of two NPN transistors 51 and 52 connected with a common emitter resistor 53 in a conventional differential amplifier circuit. The amplifier 47 operates through an additional amplifier stage 54 (if desired) to control the flow of heating current to the heating coil 11 in accordance with the voltage difference existing between the two output terminals 48 and 49 of the bridge. The bases of the transistors 51 and 52 are connected to the output terminals 48 and 49, respectively; thus a greater share of the total current passing through the common emitter resistor 53 is conducted by the second transistor 52 whenever the negative voltage at the first coupled output terminal 48 decreases with respect to that on the opposite, second output terminal 49. More current flow through the second transistor 52 is reflected as an increase in the amount of heating power supplied through the additional amplifier stage 54 to the heater coil 11 on the can 10. Heretofore, the amount of current supplied to the heating coil 11 was controlled by the single normal thermistor 41; as temperature increases, the resistance of the normal thermistor 41 decrease reducing both the negative voltage at the first output terminal 48, and the power supplied to the heating coil 11. However, the two additional thermistors 42 and 43 replace the normal fixed resistors of the bridge circuit to form a thermal differentiator circuit with lead network operation. The additional thermistor 42 connected in the base-to-emitter circuit of the second transistor 52 tends to increase current flow when its resistance is increased due to a lower temperature. With this in mind, it may be seen that the two additional thermistors 42 and 43 act together to form a thermal differentiator circuit to decrease the normal current flow when the exterior wall temperature is greater than the interior oven temperature as during the warm-up period. This lead effect is utilized to bring the interior oven temperature gradually to the desired level by cutting off the heating coil at some time interval before the desired crystal temperature is reached. In contrast, when the outside temperature of the oven 10 is lower than inside, as happens during operation when the ambient temperature is suddenly lowered, the thermal differentiator circuit tends to increase current flow to the heating coil 11 in anticipation of higher power requirement.

As previously mentioned, this lead circuit arrangement has two definite advantages over the control provided by the single thermistor bridge. First, initial overshoot of the desired temperature during warm-up can be avoided, and the time required after reaching the approximate level for the oven to settle at the desired temperature is decreased. Secondly, high frequency response is increased to improve the stability of oven control thus making it possible to use appreciably more gain in the D.C. amplifier 47 and the succeeding power stages. The term "high frequency response" is used herein to describe the fact that the control circuitry produces an error signal of a particular magnitude which anticipates an actual change in oven temperature, thereby responding faster or at a higher frequency to conditions within the oven. The increased stability in this case results from the fact that the differentiator circuit, although producing a greater error signal at the time of an abrupt change in outside temperature, later reduces the error signal as the desired inside temperature is approached thus preventing instability due to large error signals However, too much high frequency response is not desirable since this corresponds to overdamping conditions during warm up, and increases the time needed for the oven to reach the approximate temperature level. High frequency response of the circuit can be controlled either by using thermistors for the thermal differentiator circuit which have lower temperature coefficients of resistance than that of the normal control thermistor 41, or by connecting two fixed resistors 55 and 56, each in parallel with a different one of the thermistors 42 and 43, to limit the total resistance change in these legs of the bridge due to a resistance change in the corresponding thermistor. The latter of these methods is of most general application since it is in most cases better to use the same type thermistor in all three positions. The higher the resistance value of the parallel resistors 55 and 56, the greater is the high frequency response.

Figure 4:
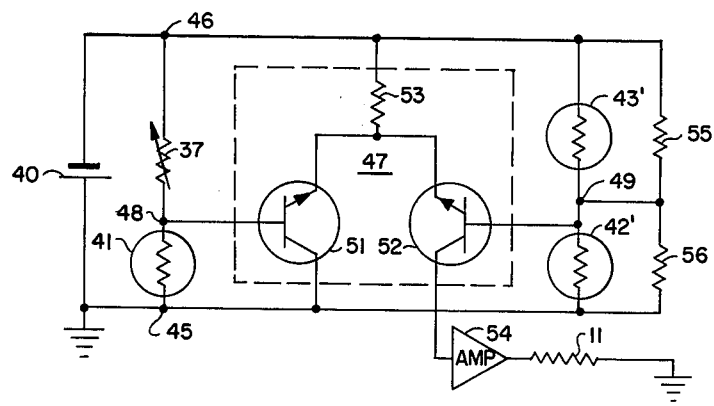
FIG. 4 is a simplified schematic circuit diagram of an oven control circuit in accordance with the invention, with the differentiator elements arranged for "lag" network operation.

Referring now to FIG. 4, the circuit is the same as that illustrated and described in connection with FIG. 3 except for a simple reversal of the positions of the thermistors forming the thermal differentiator circuit. The thermistors 42' and 43' are connected in the bridge circuit to produce a lag network rather than the former lead network. This in effect merely reverses in sign the signal added by the thermal differentiator circuit to the signal produced by the normal thermistor 41 so that stability of the oven control circuitry is improved by reducing the high frequency gain below its normal value. During warm-up time the additional current flow produced allows the interior oven temperature to initially reach the desired level much faster, but a longer settling time is required for the control circuit to reach steady state. After settling, the temperature can be maintained more evenly at the desired level since the gain of the amplifier can be considerably raised to detect smaller error signals. The damping action provided by the lag network prevents the increased gain from causing instability. However, the damping also prevents quick response to abrupt changes.

Referring now to FIG. 5, stable operation of a crystal oscillator circuit employing the aforementioned oven control circuitry is best achieved by careful arrangement of the circuit elements with relation to the crystal oven. The arrangement of these elements will be explained by reference to the circuit diagram illustrating the connection of a typical crystal oscillator circuit with the temperature control circuit. It is to be understood that the invention is not limited to the particular oscillator or the auxiliary circuits shown herein.

The basic crystal oscillator circuit is essentially conventional and contains a pair of matched NPN transistors 61 and 62 having a common emitter resistor 63. A tank circuit 64 coupled between the collectors of the transistors 61 and 62 can be finely tuned by means of the variable capacitor 65 to the proper frequency. Oscillations which result from the tank circuit's oscillations being fed back through the crystal 12, which is series mode resonant at the selected frequency, to the base of the transistor 62. A variable resistor 66 connected across the tank circuit 64 is used to adjust the low Q of the tank circuit to obtain maximum efficiency in energy transfer through the high Q of crystal 12, as is well known in the art. A pair of zener diodes 67 and 68 provide regulated voltages to the oscillator elements from the positive D.C. sources 69.

The high frequency outputs from the oscillator are amplified in a pair of amplifier stages provided by two transistors 71 and 72 for delivery to a clock output circuit 73 for utilization as a time standard. If desired, a modulation signal of low frequency and variable amplitude from the signal source 74 can be used as a vernier adjustment of the frequency of the oscillatory signals. The amplitude of this modulation signal determines the capacitance presented by a pair of Varicap diodes 75 and 76 to thereby provide a variable reactance between the oscillator and the high frequency amplifier.

The temperature control circuitry including the differentiator circuit is shown essentially as previously described in FIG. 3, except for the addition of a zener diode 77 to regulate the voltage supplied across the bridge circuit input terminals 45 and 46. The additional amplifier stage 54 consists of a pair of matched transistors 78 connected as a conventional Darlington D.C. amplifier circuit. The amplified D.C. error signal delivered to the base of a power transistor 79 acts to pass the required heating current in controlled amounts to the pair of resistor elements making up the heating coil 11.

Most of the elements of both the oscillator circuit and the temperature control circuit are contained within the isothermal oven can 10. This internal circuitry is segregated from the remaining elements by dashed separation lines in FIG. 5. Generally, all circuit elements whose parameters are determinative of the operation of the oscillator and the control circuits should be included within the isothermal can 10 so that their circuit values are constant. Other elements whose values are not critical are more conveniently located outside of the oven if their presence within would tend in some way to upset the desired temperature control. For example, the bulky power supplies 69 and 81 are obviously best located outside of the housing so that the heat mass within is not unduly increased. Such circuits as the clock output circuit 73 and the frequency modulation signal source 74 are necessarily located outside of the housing as external input and output circuits. Five voltage dropping resistors 83, 84, 85, 86, and 87, which tend to consume large amounts of power but whose parameters are not critical, should be located away from the can 10 to prevent their acting as a substantially unregulated heat source within the oven space. The heating coil 11 and the two sensing thermistors 41 and 42 (or 43' for the lag network) are mounted on the can as previously described. Since the current flow through the resistor 89 to the base of the power transistor 79 is regulated, it also may be mounted upon the can 10 to aid the heating coil 11.

In the various arrangements, the circuitry has been illustrated by using NPN or PNP type transistors and thermistors having negative temperature coefficients of resistance. As is well known, opposite conductivity type transistors may be substituted for each of the transistors if desired through reorientation of the applied voltages in accordance with principles well known in the art. Also it is possible to replace the negative coefficient thermistors with positive coefficient thermistors by simply interchanging the circuit elements in accordance with well-known principles.

While the invention has been described in detail relating to temperature regulation for use with a crystal oscillator circuit, it is intended that the illustrative arrangement be taken as exemplary only of one way in which the invention may be utilized. The precise temperature regulation of an enclosed space has many related applications in a variety of fields. For example, atomic frequency standards utilize the resonant frequency of an atom to monitor a crystal oscillator. Here temperature stabilization of the crystal ocillator is a necessary prerequisite for realizing the accuracy to be attained by use of atomic phenomena as a frequency control source.

It will be understood that various changes in the details which have been herein described and illustrated in order to explain the nature of the invention may be made by those skilled in the art within the principle and scope of the invention as expressed in the appended claims.

What is claimed is:

1. A temperature control circuit for maintaining a preselected level of temperature within an oven space, comprising first temperature sensing means positioned to produce a first output signal indicative of the amount by which the actual oven temperature differs from the preselected level, second temperature sensing means positioned to produce a second output signal indicative of the temperature difference between the interior and the exterior of the oven space, comprising means connected to said first and second temperature sensing means for comparing the first and second output signals and producing an error signal proportional to the algebraic combination thereof, and heat transfer means adjacent the oven space for regulating the flow of heat in the oven space in accordance with the amplitude of an applied error signal, the means for controlling the heat flow being connected to the comparing means for receiving the error signal produced thereby.

2. An oven arrangement for maintaining an object at a constant temperature, comprising an isothermal oven container enclosing said object, an electrical heater element mounted on the oven container, first and second temperature sensing means mounted adjacent the oven container and responsive to the temperature thereof, third temperature sensing means mounted adjacent the object and responsive to the temperature thereof, circuit means for comparing the temperature sensed by said first temperature sensing means with a preselected temperature to produce an output signal indicative of the differences, second circuit means for comparing the temperatures sensed by said second and third sensing means to produce an output signal indicative of the temperature difference, means connected to said first and second comparing means to produce an output signal indicative of the combination of the two signals, and control means connected to supply a varying amount of electrical power to the electrical heater element in accordance with the value of the combination signal from the combining means.

3. A piezoelectric crystal oven comprising an enclosed isothermal oven structure, an electrical heater element mounted on the outside of the oven structure, heat insulating means surrounding the oven structure and the electrical heater element, a bridge circuit having four resistive legs, a first three of said resistive legs being of a material having a high temperature coefficient of resistance, the remaining resistive leg being of a material having a substantially fixed resistance, two of the first three of the resistive legs being positioned to sense the temperature of the outside of the oven structure, the other of the first three of the resistive legs being positioned to sense the temperature at the inside of the oven structure, a differential amplifier circuit connected to said bridge circuit for sensing the voltage difference between the output terminals thereof and producing an output signal indicative of the difference, and means responsive to the output signal of the differential amplifier circuit for supplying a varying amount of power to the electrical heater element.

4. In a device for maintaining an oven space at a substantially constant temperature by varying the power supplied to a heater element, the combination comprising a differential amplifier having two input terminals for producing an output signal proportional to the sum of the amplitude of two input signals applied thereto, and a bridge circuit having four legs, two of said legs being connected in a first voltage divider circuit including a substantially fixed value resistor and a temperature sensing resistor having a high temperature coefficient of resistance for sensing the temperature of the space, said first voltage divider producing a first input signal and being connected to one of the input terminals of said differential amplifier, the other two of said legs being connected in a second voltage divider circuit including second and third temperature sensing resistors connected one in each of the two legs, said second voltage divider circuit producing a second input signal connected to the other input terminal of said differential amplifier indicative of the temperature difference between the second and third temperature sensing resistors, said second and third temperature sensing resistors being positioned to sense the external and internal temperature respectively of said oven space, the output signal from the differential amplifier being connected to control the power supply to the heater element.

5. A temperature control circuit for maintaining a predetermined temperature within a container, comprising means including a fixed resistor and a first thermistor for producing a first signal voltage indicative of the temperature difference between the actual temperature of the interior of the container and a predetermined temperature, means including second and third thermistors for producing a second signal voltage indicative of the temperature difference between the interior and exterior of the container, signal combining means connected to receive said first and second signal voltages for producing a control signal indicative of the value of said first signal voltage minus the value of said second signal voltage when the interior is at a lesser temperature than the exterior, and temperature control means connected to receive said control signal for varying the temperature applied to the exterior in accordance with the value of the control signal.

6. The temperature control circuit of claim 5, in which said thermistors have negative temperature coefficients of resistance, and are connected with said fixed resistor in a bridge circuit arrangement, and said second thermistor being connected between opposite ends of said fixed resistor and said third thermistor.

7. A temperature control circuit for maintaining a predetermined temperature within a container, comprising means including a fixed resistor and a first thermistor for producing a first signal voltage indicative of a temperature difference between the actual temperature of the container and a predetermined temperature, means including second and third thermistors for producing a second signal voltage indicative of the temperature difference between the interior and exterior of the container, signal combining means connected to receive said first and second signal voltages for producing a control signal indicative of the value of said first signal voltage plus the value of said second signal voltage when the interior is at a lesser temperature than the exterior, and temperature control means connected to receive said control signal for varying the temperature applied to the exterior in accordance with the value of the control signal.

8. The temperature control circuit of claim 7 in which the thermistors have negative temperature coefficients of resistance, and wherein said thermistors and said fixed resistor are connected in a bridge circuit arrangement with said first and third thermistors connected between opposite ends of said fixed resistor and said second thermistor.

References Cited by the Examiner
UNITED STATES PATENTS

| | | | |
|---|---|---|---|
| 3,028,473 | 4/62 | Dyer et al. | 219—501 |
| 3,134,006 | 5/64 | Dorsman | 219—499 |
| 3,136,877 | 6/4 | Heller | 219—499 |

RICHARD M. WOOD, *Primary Examiner.*